Jan. 1, 1963 E. KRABBE ETAL 3,071,469
PROCESS IN THE MANUFACTURE OF BEER AND THE LIKE
Filed Jan. 14, 1960 4 Sheets-Sheet 1

INVENTORS
ERIK KRABBE
KENNETH W. WENDT

BY

ATTORNEY

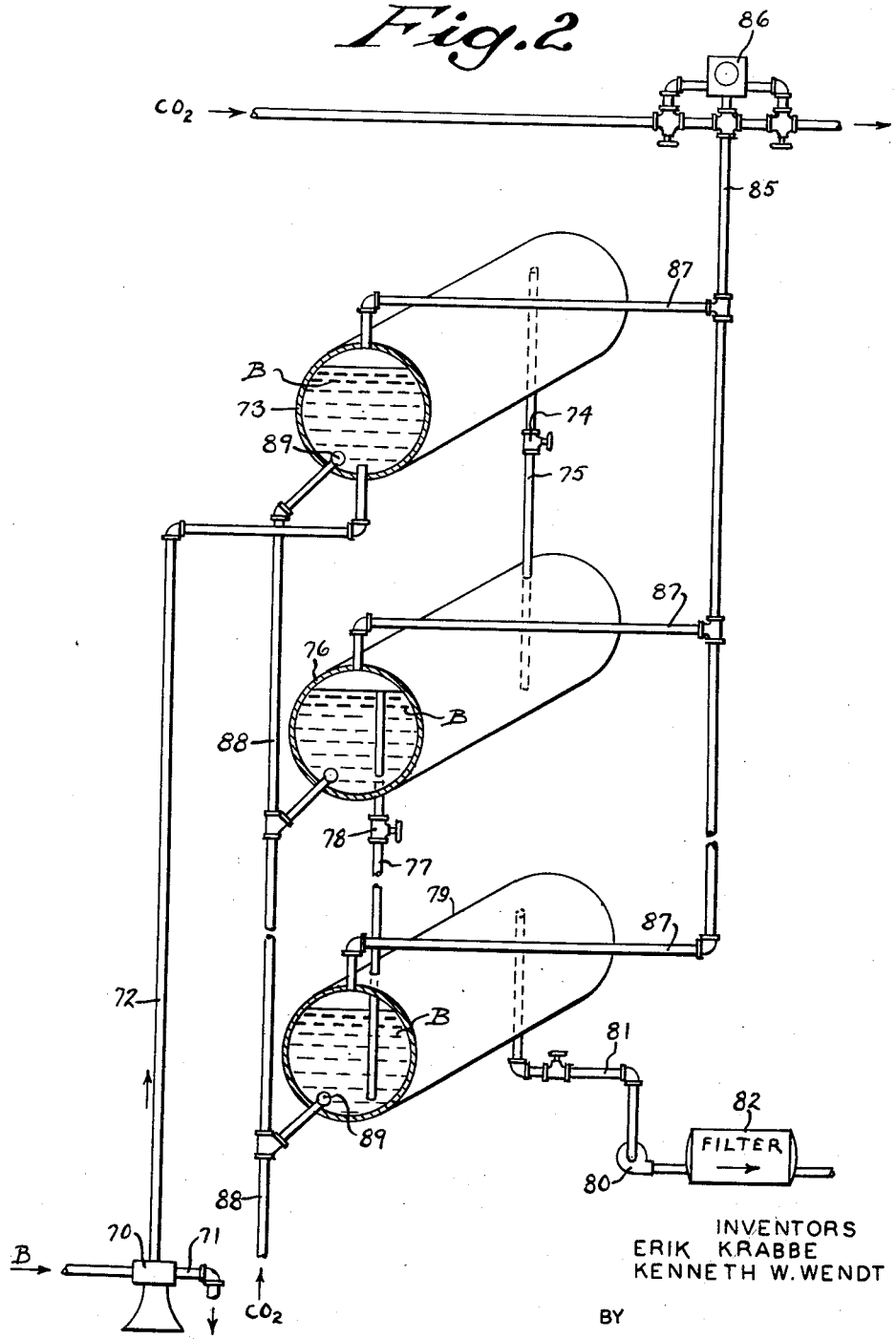

Jan. 1, 1963 E. KRABBE ETAL 3,071,469
PROCESS IN THE MANUFACTURE OF BEER AND THE LIKE
Filed Jan. 14, 1960 4 Sheets-Sheet 3
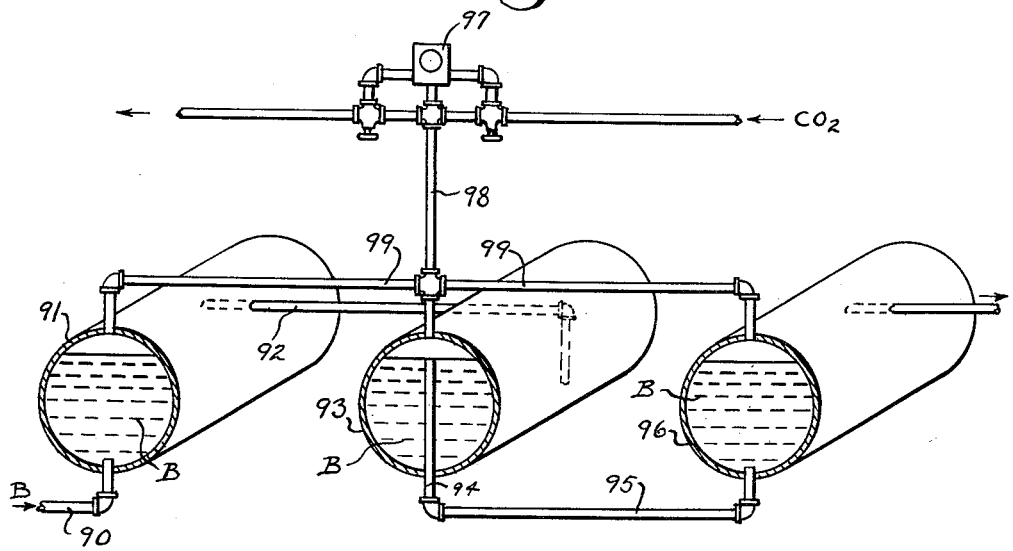
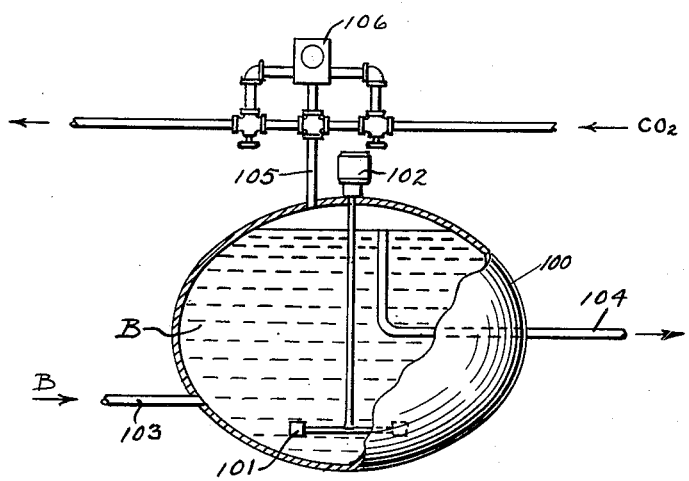
INVENTORS
ERIK KRABBE
KENNETH W. WENDT
BY
ATTORNEY

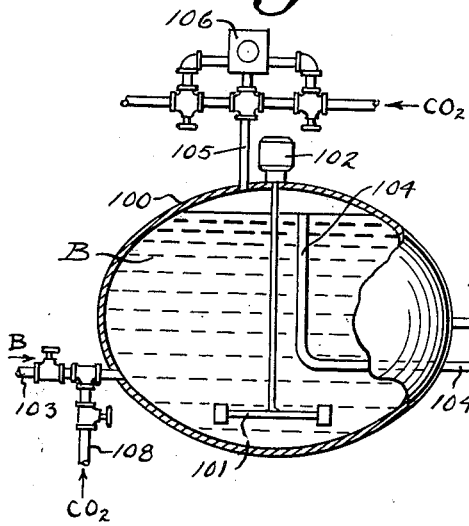
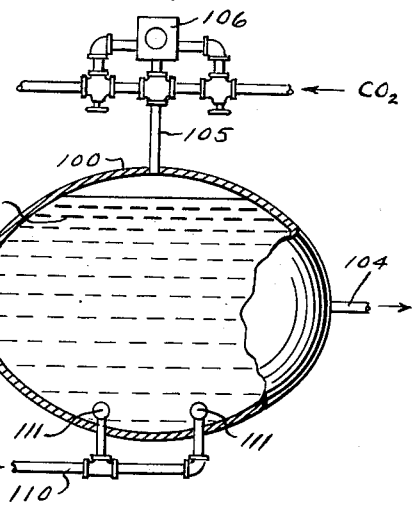
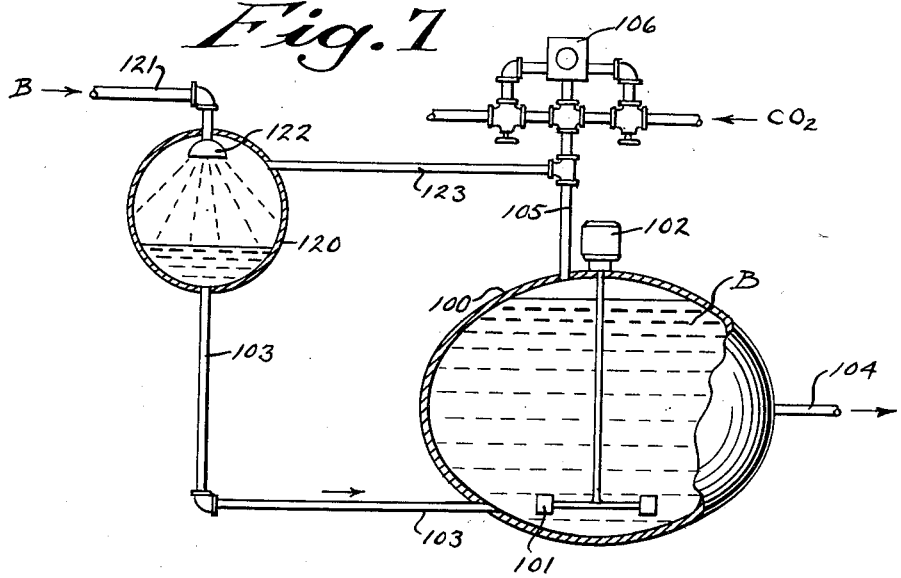

United States Patent Office 3,071,469
Patented Jan. 1, 1963

3,071,469
PROCESS IN THE MANUFACTURE OF
BEER AND THE LIKE
Erik Krabbe, Milwaukee, and Kenneth W. Wendt, Brookfield, Wis., assignors to Miller Brewing Company, Milwaukee, Wis., a corporation of Wisconsin
Filed Jan. 14, 1960, Ser. No. 2,436
11 Claims. (Cl. 99—48)

The present invention relates to an improved process and apparatus for the manufacture of beer and the like and includes among its objects the provision of improved apparatus for aging and finishing of beer and fermented beverages, and of improved procedures for accomplishing the same.

Historically, the art of brewing has traditionally been a batch type process involving a series of individual and independent steps. Such is the case even today in practically all of the modern breweries. During processing the mash, the wort or the beer remains in one tank for a specified period after which it is transferred to another tank for a subsequent period, and so on through numerous process steps. Each transfer involves emptying, cleaning and filling of the particular tanks.

Large breweries have a thousand and more separate tanks. These tanks are generally housed in large, refrigerated buildings according to regular patterns. It is not unusual to provide even a twelve-story building with as many as 240 tanks placed in opposed arrangements of 20 tanks per floor.

It will be apparent that, because of economic considerations and the many other advantages of a continuous flow process, it is most desirable to convert all or parts of the combersome batch brewing process to an efficient continuous process. Obviously, the ultimate goal is to provide a continuous brewing process from the initial infusion of malt and adjuncts into the mash to the hopping in the brew kettle, and from the brew kettle to the fermenting stage, and thus, without interruption, through the remaining aging steps of ruh storage, finishing storage and from there to final packaging operations.

In the course of investigating continuous brewing techniques, we have considered first the aging and finishing stages of brewing and have found this to be a logical approach, inasmuch as aging requires considerable storage facilities in even the smallest of breweries. Storage containers are relatively expensive and many are required to insure a desirable aging period for the fermented beer. This storage period is required at all times, despite seasonal variations in consumer demand. Expensive glass-lined, storage vessels are now being used, and in some breweries, wood casks still find favor for storage. Although less expensive initially, the wood casks require considerable maintenance, and must be pitched periodically to prevent leakage. Obviously, the labor requirements in a batch process are considerable, inasmuch as it is most often the practice to handle the aging beer two or more times, at least once for ruh storage, and then again for finishing storage. The individual storage tanks are thoroughly cleaned before introducing beer from the fermenter for ruh storage, and before a transfer is made from the individual ruh tanks or vessels to a finishing storage tank, the finishing tank is again cleaned. Very often cleaning techniques require two men, and these men are capable of maintaining only a very few tanks each day. It is apparent that in the traditional batch type processing the total tank storage capacity is never fully used because some tanks are always out of production for cleaning. Further, the tanks being filled or being emptied are only used to a fraction of their capacity.

The purity demand in good brewing practice dictates thorough cleaning, once a tank is opened and exposed to the surrounding atmosphere.

Another very important aspect to be reckoned with in the batch-type brewing process is that upon each introduction and removal of the aging beverage in its various stages, air is introduced to the storage vessel and this affords an opportunity for the fermented beverage to be placed in direct contact with an oxidizing and non-sterile atmosphere.

Fermented beer in a closed fermenter contains virtually no free oxygen. In the course of conventional batch-type processing it is practically impossible to avoid the introduction of oxygen into the beer, in spite of all reasonable efforts to prevent such contamination. It is well known that beer suffers flavorwise from contamination with oxygen. Furthermore, the presence of free oxygen stimulates the growth of undesirable organisms.

Yeast introduced to the wort is an extremely aggressive agent that tends to dissipate any surrounding oxygen by consuming the oxygen and replacing the same with copious amounts of carbon dioxide, to thereby aid in preventing the undesirable growth of microorganisms that may be present. Thus, the fermented material is relatively stable from a bacteriological standpoint, and will remain stable until such time as it may be placed in contact with air.

The present invention provides a superior process and apparatus for insuring the substantially complete elimination of air during aging of the beer; further, the results of which tend to stabilize the biological conditions affecting the process.

While investigating the overall brewing procedure in an effort to convert at least a part of the process from the relatively uneconomical batch-type process to a continuous flow process, we have discovered that, even though a continuous flow schedule in accordance with the present invention was established for a period of over eleven months without any interruptions for emptying, cleaning and refilling of the various storage tanks or piping in that period, samples of duly aged beer exhibited a very satisfactory microbiological condition in the continuous train, even in spite of sporadic contaminations in the beer "infeed." The end product also exhibits superior chill stability and overall physical stability without noticeable change in flavor or foam stability. We have also found it to be further desirable and important to provide a blanket of carbon dioxide to the storage facilities and, in fact, it is further beneficial to provide a continuous purging of carbon dioxide directly into the beer in the tanks comprising the continuous train or into the flow of beer during the continuous transfer from one tank in the train to the next.

Thus, not only has the present invention provided increased economic advantages, but beer or ale manufactured under the process has been found to exhibit superior characteristics.

The present invention contemplates a number of embodiments, including installations for the conversion of existing tank storage facilities to a system of continuous flow aging and without undue modification thereof. Other embodiments provide disclosures of relatively more economical construction for use in new installations, and which provide similar desirable results in the end product.

The various embodiments of the present invention will now be described by way of example with reference to the accompanying diagrammatic drawings in which:

FIG. 2 is a diagrammatic representation of another embodiment of the apparatus of the present invention;

FIG. 3 is a diagrammatic representation of a horizontally disposed installation in accordance with another embodiment of the present invention;

Figure 1:
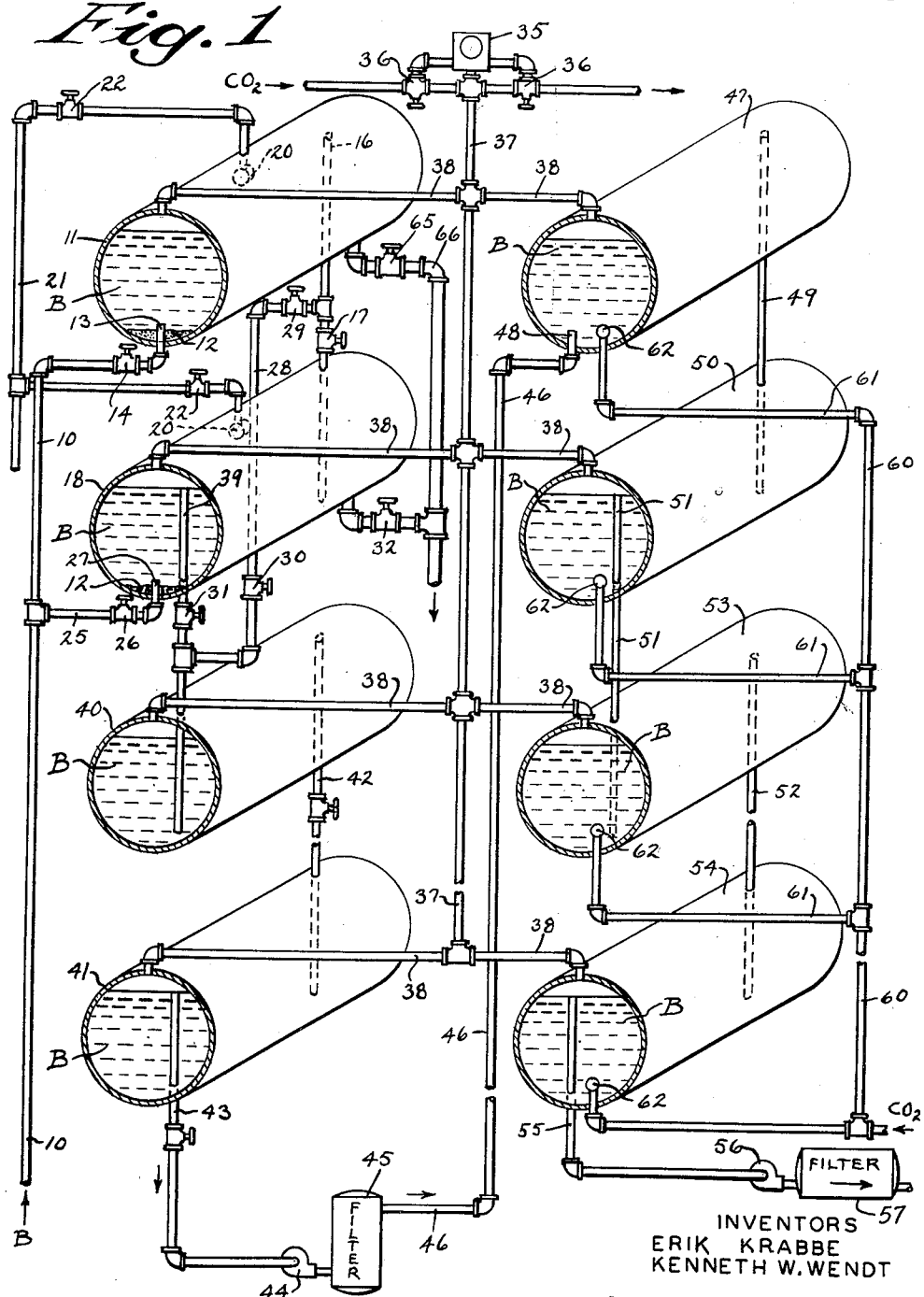
FIG. 1 is a diagrammatic representation of an apparatus for the aging stages in the processing of beer or the like, in accordance with the teachings of the present invention.

FIGS. 4–7, inclusive, are illustrative of further embodiments of the present invention, each relating to the installation of a single storage vessel for use, for instance in the finishing processes for preparing beer and the like.

Reference to the apparatus of FIG. 1 will reveal that existing batch-type storage facilities may be readily converted to continuous processing of beer and the like. The diagram of FIG. 1 is illustrative of either an existing system which has been converted to continuous flow operations or, when desired, the installation of a new system providing the resulting advantages of the present invention.

It will be apparent that the present embodiment relates to a vertically arranged installation having the advantages of gravity flow between tanks. In the past, it has been the usual procedure to independently fill the individual tanks with incoming ruh beer, permit the liquid to either settle out the sedimentary fermenting material in the ruh storage vessel and age the settling beer for a desired period, transfer the beer to the finishing storage tank for another aging prior to its removal for packaging. Before new beer is introduced to either the ruh storage vessel or the finishing vessel, the batch process requires cleaning of the individual vessels or tanks and their necessary piping and connections fixtures.

It will be apparent from the ensuing description that by converting the individual, independently operated batch tanks to a continuous flow apparatus, storage capacity will even be considerably increased, because the tanks remain filled at all times. The total volume of the continuous train is calculated to provide a hold-up period equivalent to the normal time lapse in the ruh and finishing tanks of the conventional batch process, and under normal conditions of temperature and pressure. The vertically arranged continuous train embodiment of FIG. 1 includes an infeed line 10 communicating with the fermenting tanks (not shown), and may include additional pumping equipment (not shown) and an auxiliary inlet (not shown) for receiving chill-proofing material, flocculents and other materials necessary for ruh storage and finishing. The fermented beer is admitted to the stockhouse by means of the infeed line 10 to the uppermost storage tank 11. Substantially all of the sedimentary material from the fermenting stage tends to settle out of the fermented beer in the first tank or tanks in the ruh storage train, when the tanks are arranged for gravity flow as shown in FIG. 1. Thus, as diagrammatically illustrated in tank 11, the sediment 12 will tend to accumulate at the bottom of the tank, and it is preferable that the infeed standpipe 13 be placed above this level for supplying the beer B, ale or the like to the tank 11. A cock or other valving means 14 is provided for controlling the infeed flow. It will be observed that an overflow portion of a standpipe 16 is provided at the rear of the tank 11 to permit gravity feed of the beer B after it reaches a predetermined level, which level depends also on the desired amount of head space. A valve 17 is preferably provided between the tank 11 and the tank 18 directly therebelow. The flow velocity of the embodiment illustrated is predetermined according to the number of storage vessels available and the resident storage time required.

As stated heretofore, the first few tanks will collect substantially all of the sedimentary material remaining in the beer B after the fermentation stage. Thus, the only tanks that need to be cleaned periodically are these first few tanks. Therefore, a transfer by-pass arrangement for the ruh storage portion is preferred for the purpose, and is shown with the first two tanks 11 and 18, although the arrangement may be extended to more than these tanks, if so desired. The by-pass arrangement will permit one of the tanks occasionally to be taken out of operation for removal of the accumulated sediment without interruption of the continuous flow from the fermentation tanks. In addition, the continuous flow arrangement of the various embodiments herein described lends itself readily to the use of a CIP (cleaned in place) automatic cleaning system. It is therefore contemplated that a conventional "spray ball" distributor 20 will be installed for properly insuring the correct distribution of cleaning and sterilizing solutions in the tanks 11 and 18. Each of the distributors is appropriately connected to an inflow cleaning fluid line 21 and includes an appropriate valve 22. The by-pass branch infeed line 25 communicating with infeed line 10 is provided with a normally closed valve 26 and a standpipe 27 in the tank 18 for use when tank 11 is being cleaned. A by-pass pipe 28 is provided in parallel relationship with the tank 18, and includes the usual by-pass valves 29, 30 and 31. The sediment may be removed through the normal drain line of the respective tanks (not shown herein for clearness of illustration).

Obviously, where so desired, automatic cleaning equipment and drain equipment may be provided for each of the various tanks, although it will be apparent from the ensuing description that the subsequent tanks may remain in continuous flow operation for periods of eleven months or twelve months or more without affecting the microbacteriological count of the beer, and these may be manually cleaned at such time.

One of the more important aspects of the present invention lies in the provision of an automatically regulated blanket of inert gas, such as carbon dioxide, nitrogen or the like. Obviously, since $CO_2$ gas is a by product of fermentation, it is in ready supply in the usual brewery for use in carbonation of the finished beverage, it is preferable to make use of this gas as a blanket over the beer in the continuous process. It is, however, not practical to effectively cover the conventional batch process with $CO_2$ because all of the $CO_2$ generated in fermentation will not suffice due to the enormous loss of $CO_2$ connected with the repeated emptying, cleaning and filling of all the tanks. The $CO_2$ blanket supply lines are fed as required, automatically from a regulator 35, and includes the usual valves 36 communicating with a main supply conduit 37 having ancillary branches 38 extending laterally therefrom to each of the various vessels or storage tanks.

It is to be noted that the preferred arrangement for the apparatus of the FIG. 1 embodiment includes the ruh storage vessels at the left hand portion of FIG. 1, and the finishing tanks or vessels are at the right side thereof. The ruh storage vessels and finishing storage vessels, as aforestated, include as many tanks or vessels as desired for both ruh and finishing storage to provide the usual resident storage period, which varies from brewery to brewery, depending upon the process, usually from two to six weeks. The ruh storage and finishing storage tanks may be separated from each other and from those above and below by conventional flooring (not shown,) and are preferably connected in the flow train by diagonal current flow agitation of the entering and leaving beer B. That is, the delivery portion of the standpipe 39 entering the tank 40 extends close to the bottom of the tank at one end thereof, and the incoming beer will then be caused to rise until it overflows into the upstanding portion of the standpipe 42 disposed at the opposite end of the tank. This gives an excellent flow distribution of the continuous beer train, and prevents stagnant areas from occurring. It will be understood, however, that mechanical agitating paddles, or other devices for preventing stagnation of flow, may be substituted for the diagonal gravity flow, if so desired.

In the case of the vertical arrangement of the embodiment of FIG. 1, the gravity fed beer finally reaches the bottom-most standpipe 43 connected to a pump 44, and from the pump 44 to a conventional beer filter 45, and from the filter 45 to an infeed pipe 46 extending upwardly to the uppermost finishing tank 47. Again, it is preferred to provide a system of distribution from one tank or vessel to the other to cause a diagonal flow by means of alternate positioning of the respective standpipes, and wherein the entrance standpipe 48 of the tank 47 is relatively short and is located at the front of the tank. The overflow portion of the standpipe 49 terminates near the top of the tank 47 and at the opposite end thereof. The infeed portion of the standpipe 49, accordingly, is preferably located at the rear of the tank 50 and has its end terminating near the bottom of that tank. The standpipes 51 and 52 are accordingly arranged to provide the gravity overflow and infeed diagonal distribution for the tanks 53 and 54, as described in connection with tanks 47 and 50. The lowermost standpipe 55 preferably terminates in a pump 56 and for discharge of the finished beer through a conventional filter 57 for packaging.

Returning to the carbon dioxide system which, as previously stated, plays an important part in the effective operation of the present apparatus and method of processing beer, the satisfactory microbiological condition of the continuous train is believed to be obtained either by the absence of free oxygen or, because of the presence of the carbon dioxide gas, which is at all times present in the continuous system. Prior to filling the continuous train with beer, all air is removed from the system and replaced by $CO_2$. From then on there is no need for supplying any more $CO_2$ than what is required for carbonation of the beer.

The beer flowing through the system remains completely covered by the inert $CO_2$ blanketing at all times. It will be apparent that very little air, if any, will ever enter the system, other than that which may be occluded in the incoming beer or with the addition of chill-proofing and settling agents. As stated, the most efficient system provides the ruh tanks 11, 18, 40 and 41 spaced oppositely of the finishing tanks 47, 50, 53 and 54 to permit gravity flow through both sections of the continuous train under complete $CO_2$ blanketing.

It will also be readily apparent that under the teachings of the present invention, the beer B may be "on stream" carbonated by means of an infeed carbon dioxide line 60 which includes branches 61 communicating with each of the finishing tanks 47, 50, 53 and 54, respectively. The carbonation may be accomplished by means of the usual foraminous carbonation stones 62 to permit good distribution and percolation therein. Another suitable method of carbonation (not shown) is to inject $CO_2$ into the beer stream as it flows from one tank to the next. In conjunction with either method of carbonation a suitable counterpressure is maintained by means of the pressure regulator 35 to obtain the desired degree of carbonation in the beer.

It will thus be apparent that after the tanks of both the ruh side and finishing portions are purged of any air contained therein, they may be filled with beer direct from the fermenting tanks to be fed to the uppermost tank 11 through the infeed line 10 and its standpipe 13. As the tank 11 fills to the level of the terminus of the overflow portion of the standpipe 16, the beer will overflow down the standpipe 16 into the tank 18 through a diagonal path to the overflow portion of the standpipe 39 to tank 40 and thus downwardly through the desired number of ruh storage tanks to the lowest tank 41.

It will be apparent that the flow may be controlled through the several valves to provide a resident storage period equivalent to that of the resident period normally utilized in batch brewing processes where individual tanks are used, by means of valve 14, or other regulatory means. From the lowermost standpipe 43, the beer is then pumped through the filter 45 to the uppermost finishing tank 47, and from this tank the beer B is fed downwardly to the various remaining tanks to provide a continuous flow equivalent to the resident period of a batch finishing stage. The finishing beer may be continuously carbonated during its flows by means of the carbonation line 60 and its branches 61 and the conventional carbonation stones 62 residing in each tank. It will be apparent that, as a means of simplifying the illustration, the usual access opening to the tanks and drain lines have been omitted from each of the tanks. It is conventional, however, to provide some means of access for occasional cleaning or replacement of the carbonation stones 62.

As previously stated, the present system is very conducive to use of automatic cleaning equipment. That is, especially in the case of the first few ruh storage tanks, such as tanks 11 and 18, the sediment 12 from the fermentation stage will tend to collect in these tanks. In order to provide a means of removing the sediment and cleaning the tanks without interruption of the continuous flow from the fermenting tanks, one or the other of tanks 11 or 18 may be temporarily removed from the line. Thus, if tank 11 is to be cleaned, the valve 14 will be closed and beer B from this tank is permitted to be drained into an auxiliary tank (not shown) through the now opened valve 65 of a conduit 66. The conduit 66 projects upwardly of the level of the sediment 12. After the tank is drained of its beer supply the valve 65 is then closed. Beer will then be supplied through the branch 25 from the infeed line 10 through the now opened valve 26, directly to tank 18, and from there to tanks 40 and 41 and any other tanks that may exist therebetween.

Tank 11 may now automatically cleaned by flushing out the sediment 12 through the normal drain line in the front of tank 11 (not shown) upon introduction of an acidic cleaning solution through the line 21 and the then opened valve 22 and through the conventional CIP spray ball 20. The $CO_2$ atmosphere preferably remains in the tank, being fed from the regulator 35. The acid solution is desirable in order to have the carbon dioxide gas present in the tank. Obviously, detergents may be used to clean the tank and any other disinfectants that may be desired before rinsing with clean water and introducing the incoming beer from the infeed line 10.

In order to remove tank 18 from service for purposes of cleaning, assuming that tank 11 has once again been placed in service, the valve 17 of the standpipe 16 will first be closed and the valves 29 and 30 of the by-pass conduit 28 will be opened. It is also necessary to close the valve 31 to prevent contamination of tank 40. Thus the beer flow will be continued through the by-pass conduit 28 to the tank 40 through the standpipe 41 in the usual fashion. Tank 18 can now be drained through conduit 66 by opening valve 32, to an auxiliary tank (not shown) or be re-cycled to the inlet conduit 10. The tank 18 will be cleaned as aforementioned in the case of the tank 11.

It will be apparent that an improved apparatus and method of aging beer has been provided by the embodiment of FIG. 1, and wherein there is a complete absence of air in the usual course of operation and, even in cases where it is necessary to clean certain tanks and transfer their contents from one to another. In fact, the method and apparatus has gone so far as to prove itself by an unfortunate instance wherein biological contamination was admitted to the system with the incoming beer in a trial installation and it was found that there was no effect upon the beer produced subsequently thereto. Undoubtedly, the complete blanketing with inert carbon dioxide and the "on stream" purge carbonation of the beer accounted for the desired characteristics. At all times, during an eleven month trial period of operation, the continuously aged beer was found to have a substantially lower air content than beers aged in the usual batch process although the fermented beer processed through both systems originated from the same supply. A very low air content in beer is conducive to improved "shelf life" (ref: "Oxidation in Beers," by Grey et al. in Wallerstein Laboratories Communication, Nos. 5-7, 1939) and particularly to improved flavor stability. The system of FIG. 1 also lends itself to ready conversion from an existing batch operated system by simple rearrangement of piping.

In the above described embodiment the beer flow is illustrated as being steadily flowing at a uniform rate. This has been so set forth for purposes of clarity and simplicity in describing the more salient features of the invention. However, to accommodate practical operating conditions, the first and last tank or tanks of the train may serve as surge tanks by suitable alterations of piping known to those skilled in the art. It is also conceivable, but relatively impracticable, to provide the continuous aging system in the form of a continuous length of relatively uniform diameter pipe, arranged in sinuous configuration for economy of space and for accessibility to heat exchange equipment.

Referring next to the embodiment of FIG. 2, this embodiment contemplates, instead of separate ruh and finishing storages, direct connection from a centrifuge or other means for separation of solids, to a single continuous train for aging the beer with a correspondingly longer resident period. Thus, the entering beer from the fermenters is first centrifuged in a continuously operated centrifuge 70 and the sedimentation or waste is then removed from the outlet pipe 71. The centrifuged or filtered beer travels from the centrifuge 70 through an infeed pipe 72 to the uppermost tank 73 in the case of a vertical arrangement of storage facilities. The gravity feed from the uppermost tank 73 is preferable and may be controlled by regulator valve 74 inserted in the standpipe 75. The pipe 75 is arranged to receive the overflow from the tank 73 and transfer it to tank 76, and preferably in a diagonal path through the overflow portion of the standpipe 77, through its valve 78 to the tank 79, or as many tanks therebetween, as desired, to provide the proper resident period for the normal capacity of the brewery. The beer, after finishing, is transported to the packaging operations (not shown), by means of a conventional pump 80 connected in the line 81 from tank 79 and then to a filter 82.

The present embodiment also contemplates the provision of a $CO_2$ blanket, or blanket of other inert gas, by means of a line 85 operated from an automatic regulator valve 86 and thus to branch lines 87 into the head space of the various tanks 73, 76 and 79. On stream purge carbonation may also be provided by means of a carbon dioxide supply line 88 terminating in conventional foraminous carbonating stones 89 residing in each of the respective tanks.

It will thus be apparent that normal batch facilities may be readily converted to continuous flow facilities and capacity may be increased by simply removing the ruh sedimentation by means of a continuously operating centrifuge and then transporting the beer to the finishing tanks for final aging, the usual storage time varying depending on the process, usually from two to six weeks.

The embodiment of FIG. 3 is illustrative of a horizontal continuous flow system in accordance with the present invention and in which beer is delivered through an infeed line 90 to a first tank 91 having an overflow discharge conduit 92 at the rear of the tank 91 for purposes of filling the next tank 93. The diagonal flow is preferred and the outlet 94 will be arranged to supply the conduit 95 terminating in tank 96 or other tanks therebetween. Again a $CO_2$ counter pressure or blanket is essential and is provided by the regulator valve system 97 to a main distributor 98 and its branches 99. On stream purge carbonation (not shown) may also be provided as previously described. This embodiment is illustrative of another system for converting conventional storage facilities into continuous flow process if such storage facilities are all located at a single level.

As previously mentioned the views of FIGS. 4-7, inclusive, diagrammatically illustrate embodiments of the present invention which provide a more economically desirable apparatus for the present process, and are particularly useful for new installations.

It will be apparent from basic geometric calculation that a spherical container will provide the most volume for the least amount of surface area, although any suitable tank will do. For hydraulic considerations it becomes practical to modify the sphere into the spheroidal configuration of the tank 100, illustrated in FIG. 4. Thus it is conceivable that a single tank may be made large enough to handle the storage requirements of an entire brewery. In order to prevent any dead storage areas from occurring, an agitator is preferably provided in the form of a conventional paddle 101 driven by a motor reducer unit 102. The tank 100 may be insulated or jacketed and provided with cooling coils (not shown) and suitable fluid baffles (not shown) or may be housed in a building having a refrigerated area surrounding the tank. The beer B thus flows in an inlet 103 from the fermenter and leaves via the outlet conduit 104 for packaging operations. Again it is essential to provide a blanket of inert gas such as carbon dioxide, from a conduit 105 regulated by means of a conventional regulator 106.

The present invention may also take the form of the embodiment of FIG. 5 which, in this case, provides on stream $CO_2$ carbonation by direct injection of the desired amount carbon dioxide through a carbon dioxide conduit 108 into beer conduit 103 causing said $CO_2$ to dissolve in the beer.

Again it is essential to provide a blanket of inert gas such as carbon dioxide from a conduit 105 regulated by means of a conventional regulator 106.

It will be noted that in each of the various embodiments like parts will be indicated by like reference numerals.

The embodiment of FIG. 6 is illustrative of an apparatus in accordance with the present invention utilizing "purge type" carbonation. In this case carbon dioxide is percolated from a supply conduit 110 to a number of conventional foraminous carbonation stones 111. Thus, this arrangement provides a combined blanketing atmosphere of carbon dioxide in the head space above the liquid, in addition to normal carbonation, along with sufficient agitation to prevent stagnant areas from occurring in the normal beer flow from the inlet 103 to the outlet 104. Any excess carbon dioxide not soluble in the beer at the operating temperature and pressure leaves the vessel 100 by means of conduit 105 regulated by conventional regulator 106.

Another embodiment of the single tank type installation is illustrated in FIG. 7, wherein the tank 100 is again provided with some form of agitating means, such as the rotating paddle 101 actuated by a motor 102. The beer infeed line 103 in this case is connected to a saturating type tank 120 wherein the beer enters via a conduit 121 and is sprayed into the interior of the vessel 120 by means of a spray head 122 and $CO_2$ is supplied via the conduit 123 and regulated to the desired pressure by regulator 106 to provide an atmosphere wherein the beer may be saturated with carbon dioxide. Regulator 106 also is used to supply a blanket of carbon dioxide to vessel 100 by means of conduit 105.

It will be apparent that the various embodiments of FIGS. 4 through 7 preferably contemplate a centrifuge or filtration system for collecting the sediment from the fermenters and thereby eliminate conventional separate ruh storage. It is conceivable, however, that an auxiliary tank may be provided for precipitation of sedimentary material, if so desired.

As stated previously, the continuous arrangement of confining the fermented beer during aging and during processes for removing the ruh sedimentation substantially, if not completely, will eliminate the presence of oxygen, which is well known to provide deleterious effects upon the finished product. The present invention further contemplates, in its preferred embodiment, provision of a blanket of inert gas, preferably in the form of carbon dioxide, and purge carbonation to further dilute or otherwise eliminate the presence of air or oxygen which might have been introduced during prior processing stages.

We claim:

1. The improved process for aging a freshly-fermented beverage such as beer and ale, comprising the steps of:

introducing the beverage into an enclosed fluid transport system and maintaining the system partially filled with the beverage;

providing a carbon dioxide atmosphere over the beverage in the system;

aging the beverage by flowing it through the system at a flow rate which will provide a system resident time period of about two to six weeks sufficient to age the beverage while maintaining the carbon dioxide atmosphere over the beverage; and withdrawing aged beverage from the enclosed fluid transport system at a point downstream from its introduction thereto.

2. The process of claim 1 further including the dissolving of carbon dioxide into the beverage from a source separate from said atmosphere and maintaining said atmosphere at a counterpressure to saturate the beverage.

3. The process of claim 1 further including the steps of bubbling carbon dioxide through the beverage flowing through the system to purge dissolved air from the beverage and controlling the carbon dioxide content of the beverage by regulating the pressure of the carbon dioxide atmosphere in the system.

4. The improved process for aging a freshly-fermented beverage, such as beer and ale, including sedimentary material from the fermenting stage, comprising the steps of:

removing the sedimentary material from the beverage and thereafter introducing the beverage into an enclosed fluid transport system to partially fill the system;

providing a carbon dioxide atmosphere substantially devoid of oxygen over the beverage in the system;

aging the beverage by flowing it through the system at at flow rate which will provide a system resident time period of about two to six weeks sufficient to age the beverage while maintaining the carbon dioxide atmosphere over the beverage; and withdrawing aged beverage from the enclosed fluid transport system at a point downstream from its introduction thereto.

5. A process according to claim 4 further including the steps of carbonating the freshly-fermented beverage by dissolving carbon dioxide therein prior to introducing the beverage into the fluid transport system and saturating the beverage with carbon dioxide by adjusting the pressure of the carbon dioxide atmosphere in the system.

6. A process according to claim 4 further including the steps of introducing carbon dioxide into the flow of the beverage through the fluid transport system to purge the beverage and controlling the carbon dioxide content of the beverage by adjusting the pressure of the carbon dioxide atmosphere in the system.

7. A process according to claim 4 further including the step of agitating the beverage flowing through the system to prevent stagnation thereof.

8. The improved process for aging a freshly-fermented beverage, such as beer and ale, including sedimentary material from the fermenting stage, comprising the steps of:

introducing the beverage into an enclosed fluid transport system to partially fill the system;

providing a carbon dioxide atmosphere substantially devoid of oxygen over the beverage in the system;

aging the beverage by flowing it through the system at a flow rate which will provide a system resident time period of about two to six weeks sufficient to age the beverage while maintaining the carbon dioxide atmosphere over the beverage;

removing the sedimentary material from the beverage subsequent to its introduction into the system;

agitating the beverage in the system after the sedimentary material has been removed to prevent stagnation of the beverage; and withdrawing aged beverage from the enclosed fluid transport system at a point downstream from its introduction thereto.

9. A process for aging a fermented beverage such as beer and ale during a resident time period of about two to six weeks, such process comprising:

providing an enclosed fluid conveying system having an inlet and an outlet;

maintaining the system enclosed for a period substantially longer in time than the resident time period of about two to six weeks;

introducing fermented beverage into the enclosed system on a continued basis during the period while the system is maintained enclosed;

aging the introduced beverage by flowing it through the fluid conveying system with a flow rate that retains introduced beverage within the system for said resident time period, of about two to six weeks;

withdrawing aged beverage from the enclosed system on a continued basis during the period while the system is maintained enclosed; and thereby aging an amount of beverage in the system during the period the system is enclosed that is substantially in excess of the volume of the system.

10. The process of claim 9 in which the fluid conveying system is maintained partially filled with beverage during the period the system is enclosed and a carbon dioxide atmosphere is maintained over the beverage.

11. The process of claim 10 in which carbon dioxide is admitted into the beverage as it passes through the system and the pressure of the carbon dioxide atmosphere is controlled to saturate the beverage with carbon dioxide.

References Cited in the file of this patent

UNITED STATES PATENTS

| | | |
|---|---|---|
| 580,536 | Theurer et al. | Apr. 13, 1897 |
| 589,065 | Zeietusch | Aug. 31, 1897 |
| 608,744 | Alberger | Aug. 9, 1898 |
| 704,533 | Garrett | July 15, 1902 |
| 2,333,154 | Markus et al. | Nov. 2, 1943 |

FOREIGN PATENTS

| | | |
|---|---|---|
| 459,577 | Great Britain | Jan. 11, 1937 |